W. B. CHAPMAN.
Rein-Holder.
No. 59,710. Patented Nov. 13, 1866.
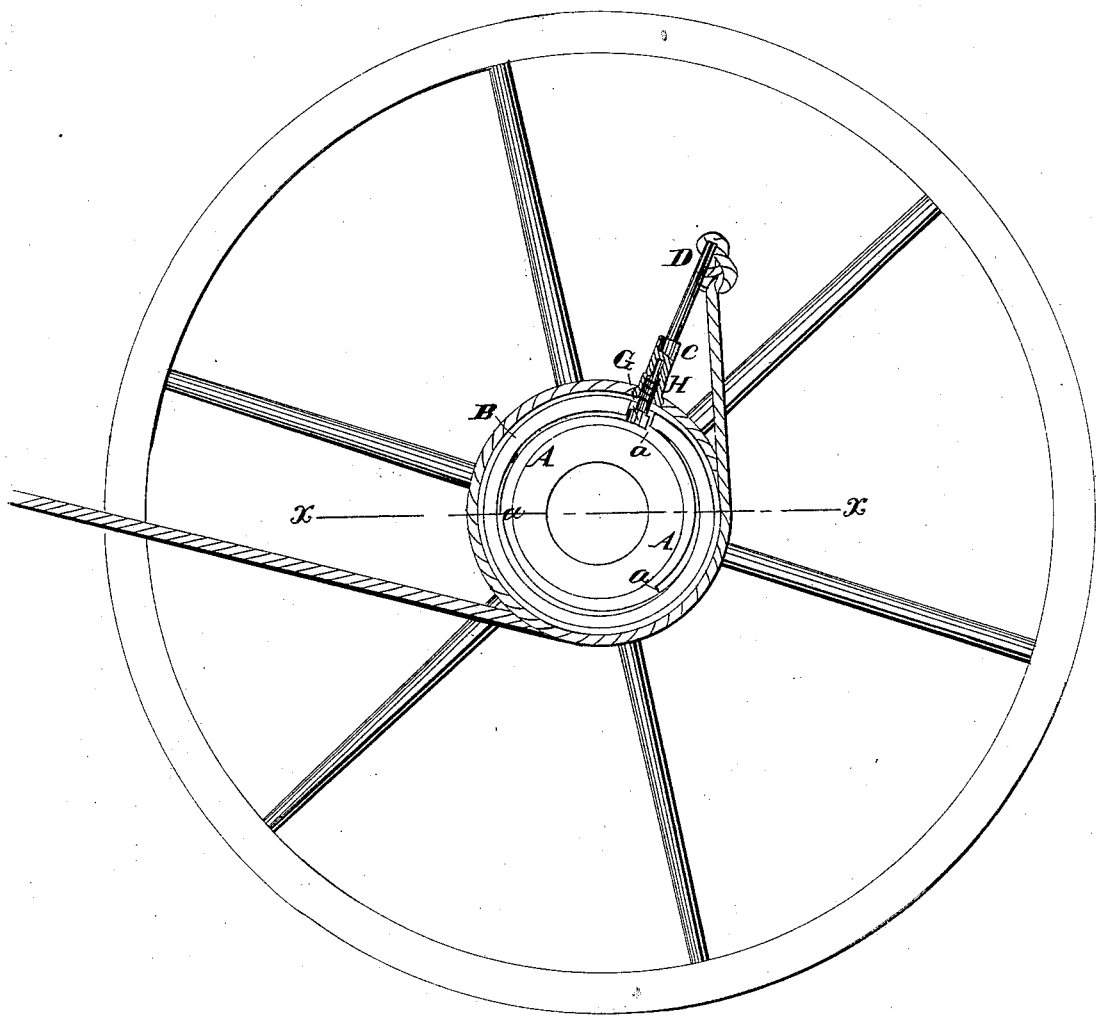
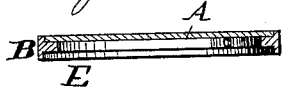
Witnesses.
Inventor:
W. B. Chapman
Per Munn & Co
Attorneys

UNITED STATES PATENT OFFICE.

WILLIAM B. CHAPMAN, OF LA SALLE, ILLINOIS, ASSIGNOR TO HIMSELF, DAVID L. HOUGH, AND WM. F. KEELER, OF SAME PLACE.

IMPROVEMENT IN HORSE-HOLDERS.

Specification forming part of Letters Patent No. 59,710, dated November 13, 1866.

*To all whom it may concern:*

Be it known that I, WILLIAM B. CHAPMAN, of La Salle, La Salle county, and State of Illinois, have invented a new and Improved Horse-Holder; and I do hereby declare that the following is a full, clear, and exact description thereof, which will enable others skilled in the art to make and use the same, reference being had to the accompanying drawings, forming part of this specification:

The present invention relates to a horse-holder, so termed, which is to be attached to the hub of a wheel of any vehicle, for the purpose of securing or making the lines or reins fast to it, and is so constructed and arranged that in case the horse or horses harnessed to the vehicle should start to run away a steady and strong pull will be produced upon the lines or reins. The more they exert the greater this pull or strain, while at the same time it freely allows the horses to back, as will be obvious from the following detailed description thereof, reference being had to the accompanying plate of drawings, in which—

Figure 1 is a view of my improved horse-holder applied to the hub of a carriage-wheel; and Fig. 2, a central section of the holder, taken in the plane of the line $x\ x$, Fig. 1.

Similar letters of reference indicate like parts.

A in the drawings represents a collar or ring that by means of screws or in any other proper manner is secured to and around the hub of the wheel of a carriage or other vehicle to which it is to be applied. This collar or ring A, around its exterior, has a series of teeth, $a\ a$, which are surrounded by an exterior concentric ring or collar, B, having an arm, $c$, with an eye or aperture, D, in its outer end, this ring B being secured around and about the ratchet or tooth-ring by means of another concentric ring or collar, E, which fits around and in the shoulder of the surrounding ring B, and is fastened to the outside face of the tooth-ring by screws at suitable points, or in any other proper manner, the surrounding ring being free to play upon the two inner and concentric rings, A and E.

G, a spring-pawl or dog arranged upon the inside of the arm $c$, and in proper position for bearing against the toothed periphery or edge of the inner ring, A, secured to the wheel, the spiral spring H, wound around such pawl, retaining and holding it against the ratchet-collar A, but yet allowing it to play in and out of the arm in which it is arranged.

From the above description it is plain to be seen that if the wheel to which the ratchet-collar is secured turns or revolves in one direction the spring-pawl of the standard will offer no obstruction to it, but if in the other or opposite direction, some one of the several teeth $a$ of the said collar, according to the position of the same, will come to a stop against the spring-pawl G, and thereby cause the surrounding ring or casing B in which such pawl is arranged to be carried around with it, thereby, if a line is hitched or fastened to and in the eye of the arm $c$ of such ring, winding such line about and around the wheel-hub, as is obvious without further explanation.

Now, if the said ratchet-collar A is secured to a wheel-hub in such a position that its teeth when the vehicle having such wheel is backed, so termed, or, in other words, moved backward, will freely pass by the spring-pawl G of the surrounding collar B, but when the carriage or vehicle moves in a forward direction will come to a stop against the spring-pawl, and consequently carry the ring in which it is arranged around with it, it is plainly apparent that if the reins or lines be fastened to the eye of the arm of such surrounding ring a strong and steady pull and strain must necessarily be produced upon such reins or lines the moment the horse or horses harnessed to the vehicle or carriage start to run away or to move forward, thereby immediately causing them to be drawn up or stopped, it being here remarked that the more the horses exert themselves to move forward the greater the pull or strain upon the lines or reins, as is manifest, the reins or lines winding around and about the wheel-hub.

Among the many advantages of my improved horse-holder hereinabove described may be here mentioned, as the most important, that it is extremely simple, and consequently not liable to become disarranged; that it is very cheap, and thus adapted to general use by all classes of persons, whether rich or in moderate circumstances; that it can be attached to a wheel-hub with the utmost facility and ease, and even by those who are but little familiar with the use of tools; that, as it is not connected with any other part of a vehicle or carriage but the wheel-hub, it is always in place, whether the axle and hub, by becoming worn from use, have a great deal of play, and that the amount of slack in the lines, whether more or less, does not affect its operation, as it must be all taken up and wound upon the the wheel-hub upon the starting of the carriage, which all other horse-holders have failed to accomplish, the importance of which is obvious; that it is so constructed as to exclude the dirt, and thus prevent it from becoming clogged, however muddy the roads may be over which the carriage passes.

I am aware that in the patent granted to James Bolton for a horse-holder, dated December 23, 1856, a ratchet-wheel and pawl have been applied to the inside of the hub of the wheel for the same purpose as in my invention; but in the invention of Bolton the hub has to be especially made to suit his invention, or else the ordinary hub must be altered for its application, whereas my invention can at once be applied to any ordinary wagon-wheel without even removing the wheel, which is necessary in Bolton's invention even in case the hub has been especially made for the application of his invention, as it is applied on the inside of the wheel; and my invention also dispenses with any extra strap or tie-rein.

I therefore disclaim entirely the invention of James Bolton, dated December 23, 1856, but What I do claim as my invention, and desire to secure by Letters Patent, is—

The arrangement and combination of the toothed collar A, surrounding collar B, having arm c, and spring-pawl G, and ring E, the whole being constructed and operated in the manner and for the purpose set forth.

WILLIAM B. CHAPMAN.

Witnesses:
M. D. AYRES,
C. S. MILLER.